A. 2,813,875
Patented Nov. 19, 1957

2,813,875
HETEROCYCLIC VAT DYESTUFFS

Wilhelm Schmidt-Nickels, Little York, and David I. Randall, New Vernon, N. J., assignors to General Aniline & Film Corporation, New York, N. Y., a corporation of Delaware No Drawing. Application December 30, 1955, Serial No. 556,473

9 Claims. (Cl. 260—316)

This invention relates to novel heterocyclic vat dyestuffs having the formula

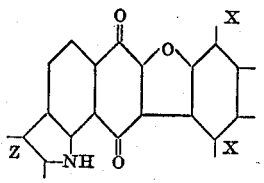

wherein one X is hydrogen, the other X is selected from the group consisting of

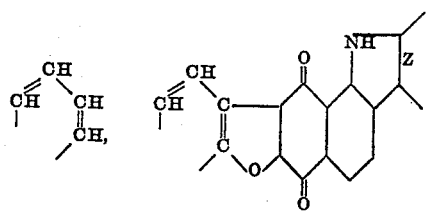

and

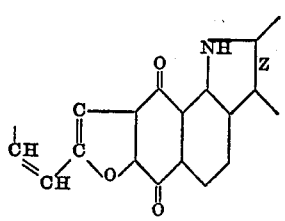

and Z represents the atoms necessary to complete an anthraquinone structure. The compounds of this invention cover a wide range of dyestuffs, depending upon the components employed, which dyestuffs have good fastness properties, particularly to light.

The provision of the above described compounds, and methods for their production constitutes the objects and purposes of the instant invention.

The compounds of the instant invention may be prepared by reacting a halogenated anthraquinone unsubstituted in one position ortho to each halo substituent with a dyestuff intermediate of the formula

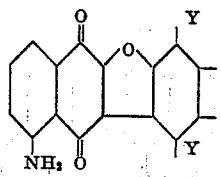

wherein one Y is hydrogen and the other Y is selected from the group consisting of

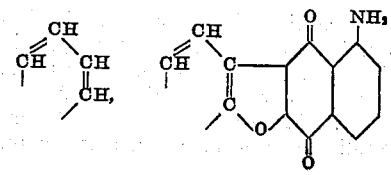

and

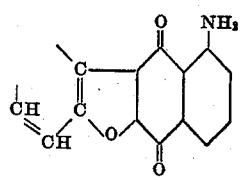

(these dyestuff intermediates, and methods for their production are disclosed and claimed in our copending application Serial No. 566,395, filed on even date herewith), in the presence of an alkaline acid binding agent and a copper catalyst followed by treatment of the resulting intermediate secondary amine reaction product with a carbazole ring closing agent.

The halogenated anthraquinones may be produced in a manner well known in the art, and generally comprise anthraquinones substituted in at least one α-position by chlorine or bromine. As representative of suitable halogenated anthraquinones which may be employed as reactants in the process of the instant invention, there may be mentioned 1-chloroanthraquinone, 1-bromoanthraquinone, 1,5- and 1,8-dichloro- and dibromoanthraquinones, and derivatives thereof containing substituents inert to the desired reaction in positions not ortho to the chloro or bromo substituents.

The initial reaction between the halogenated anthraquinone and the above defined dyestuff intermediate is carried out in the presence of an alkaline acid binding agent, such as sodium carbonate, potassium carbonate, and the like, and a copper catalyst which may be copper in any form, copper oxide, cuprous chloride, cupric acetate, and the like in the presence of an inert organic diluent such as an aromatic hydrocarbon or halogenated aromatic hydrocarbon. As representative of such diluents, there may be mentioned nitrobenzene, chlorobenzene, dichlorobenzene, trichlorobenzene, naphthalene, and the like.

The temperature at which this reaction may be carried out will be dependent upon the particular components present in the reaction mixture and the diluent employed. Generally, elevated temperatures are preferred, which for example may range from 100 to 250° C. or more. The optimum temperature in any particular instance will be readily ascertainable by the worker skilled in the art. It will be similarly apparent that the molar proportions of the reactants to be employed will depend upon the number of halogen atoms in the anthraquinone reactant, and the number of free amino groups in the dyestuff intermediate.

The resulting intermediate secondary amine reaction product is then carbazole ring closed in known manner by treatment with the known carbazole ring closing agents. In general, anhydrous aluminum chloride is employed at elevated temperatures, in a fused state or in an inert organic diluent. As representative of suitable carbazole ring closing agents there may be mentioned aluminum chloride in an inert diluent such as sulfur dioxide, pyridine, or nitrobenzene, in which case the ring closing reaction may be carried out at any temperature from room temperature up to 100° C. or more. Or a hot melt of anhydrous aluminum chloride, sodium chloride or potassium chloride, with or without sulfur dioxide, may be employed.

The following examples, in which parts are by weight unless otherwise indicated, are illustrative of the instant invention and are not to be regarded as limitative. Unless otherwise indicated, parts by weight are in grams and parts by volume are in cc.

Example 1

A charge of 30 parts by volume nitrobenzene, 2.0 parts by weight of the compound of the structure

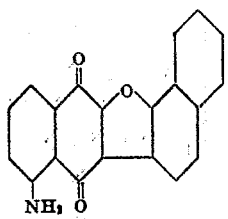

prepared as described in Example 1 of said copending application 2.1 parts by weight 1-benzoylamino-4-chloranthraquinone, 0.6 part by weight soda ash and 0.2 part by weight copper powder was stirred at 200–205° C. for 8 hours. The intermediate secondary amine reaction product was filtered off at room temperature, washed with nitrobenzene, acetone, warm water and dried.

*Cyclization.*—A charge of 50 parts by weight anhydrous aluminum chloride and 10 g. sodium chloride was heated to a melt of 140° C. At this temperature 2.4 parts by weight of the above intermediate reaction product was added to the melt. Stirring was continued for 1 hour at 130–150° C. Then the mass was decomposed with dilute hydrochloric acid. After filtration and washing with water the crude dyestuff cake was heated at 70° C. for 2 hours in a bleaching solution consisting of 100 parts by volume water, 5 parts by volume 20% sodium hydroxide solution and 10 parts by volume sodium hypochlorite solution.

Finally the dyestuff was filtered off, washed neutral and dried. It has the formula:

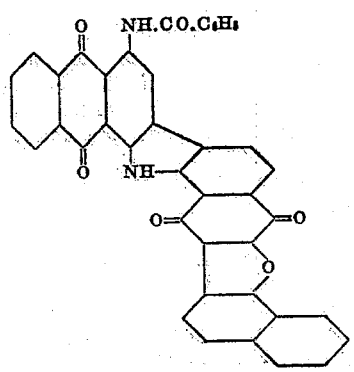

The product dyes cotton from an alkaline hydrosulfite vat brown shades of good fastness properties particularly to light.

Example 2

A charge of 30 parts by volume nitrobenzene, 2.0 parts by weight of the compound of the structure:

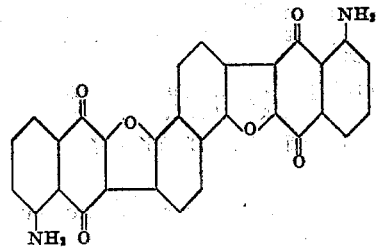

prepared as described in Example 3 of said copending application, 2.9 parts by weight 1-benzoylamino-4-chloranthraquinone, 0.8 part by weight soda ash and 0.2 part by weight copper powder was stirred at 200–205° C. for 20 hours and worked up as described in Example 1. The cyclization of the thus obtained intermediate secondary amine reaction product was carried out as described in Example 1 giving the dyestuff of the formula:

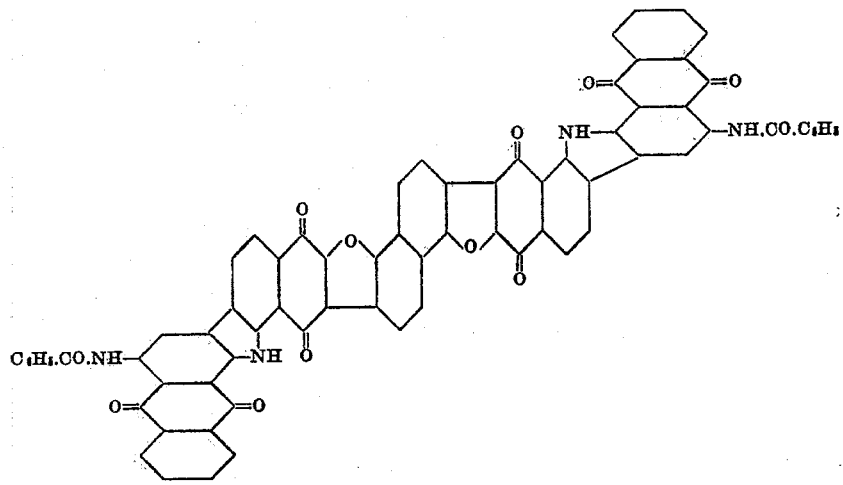

The product dyes cotton from an alkaline hydrosulfite vat strong brown shades of the same good fastness properties as obtained with the dyestuff of Example 1. The shade is redder against the product of Example 1.

Example 3

A charge of 30 parts by volume nitrobenzene, 2.1 parts by weight of the compound of the structure:

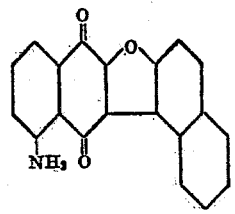

prepared as described in Example 2 of said copending application, 2.4 parts by weight 1-benzoylamino-4-chloranthraquinone, 0.7 part by weight soda ash and 0.2 part by weight copper powder was stirred at 200–205° C. for 8 hours and worked up as described in Example 1.

The resulting intermediate secondary amine reaction product was cyclicized as described in Example 1 giving the dyestuff of the formula:

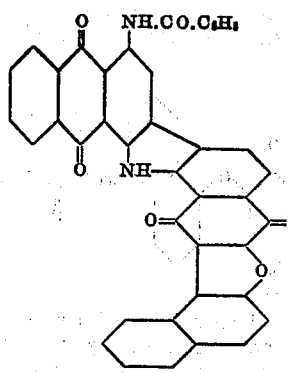

The product dyes cotton from an alkaline hydrosulfite vat brown shades of the same good fastness properties as obtained with the dyestuff of Example 1. The shade is a little redder against the product of Example 1 but less reddish than the dyestuff of Example 2.

This invention has been disclosed with respect to certain preferred embodiments, and various modifications and variations thereof will become obvious to the person skilled in the art. It is to be understood that such modifications and variations are to be included within the spirit and purview of this application and the scope of the appended claims.

We claim:

1. Compounds having the formula

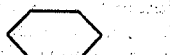

wherein one X is hydrogen, the other X is selected from the group consisting of

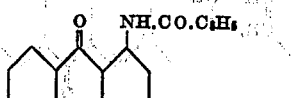

and

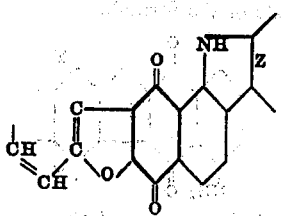

and Z represents the atoms necessary to complete an anthraquinonyl radical.

2. A compound having the formula

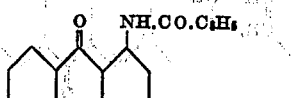

3. A compound having the formula

4. A compound having the formula

5. A process comprising reacting a halogenated anthraquinone selected from the group consisting of chlorinated and brominated anthraquinones unsubstituted in one position ortho to each halo substituent with a dyestuff intermediate of the formula

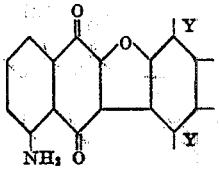

wherein one Y is hydrogen and the other Y is selected from the group consisting of

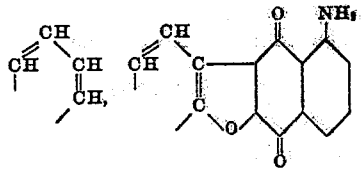

and

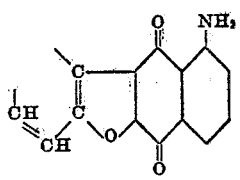

in the presence of an alkaline acid binding agent and a copper catalyst, followed by treatment of the resulting secondary amine reaction product with a carbazole ring closing agent.

6. A process as defined in claim 5 wherein the carbazole ring closing agent is anhydrous aluminum chloride.

7. A process comprising reacting 1-benzoylamino-4-chloranthraquinone with a compound having the formula

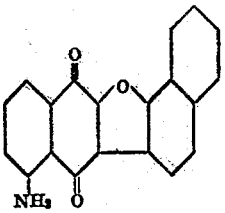

in the presence of soda ash and copper, and then carbazole ring closing the resulting secondary amine reaction product by treatment with anhydrous aluminum chloride.

8. A process comprising reacting 1-benzoylamino-4-chloranthraquinone with a compound having the formula

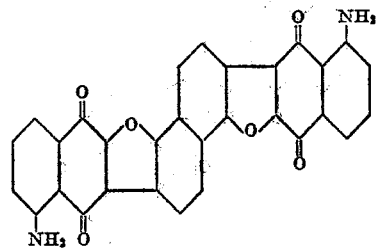

in the presence of soda ash and copper, followed by carbazole ring closing the resulting secondary amine reaction product by treatment with anhydrous aluminum chloride.

9. A process comprising reacting 1-benzoylamino-4-chloranthraquinone with a compound having the formula

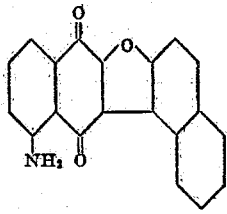

in the presence of soda ash and copper, followed by carbazole ring closing the resulting secondary amine reaction product by treatment with anhydrous aluminum chloride.

No references cited.